United States Patent [19]

Aoyagi

[11] Patent Number: 4,616,313

[45] Date of Patent: Oct. 7, 1986

[54] HIGH SPEED ADDRESS CALCULATION CIRCUIT FOR A PIPELINE-CONTROL-SYSTEM DATA-PROCESSOR

[75] Inventor: Keizo Aoyagi, Tokyo, Japan

[73] Assignee: Tokyo Shibaura Denki Kabushiki Kaisha, Kawasaki, Japan

[21] Appl. No.: 592,012

[22] Filed: Mar. 21, 1984

[30] Foreign Application Priority Data

Mar. 25, 1983 [JP] Japan .................................. 58-49925

[51] Int. Cl.⁴ ............................................. G06F 9/38
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,079,451 | 3/1978 | Woods et al. | 364/200 |
| 4,172,287 | 10/1979 | Kawabe et al. | 364/200 |
| 4,172,289 | 10/1979 | Struger et al. | 364/900 |
| 4,251,859 | 2/1981 | Momose et al. | 364/200 |
| 4,307,447 | 12/1981 | Provanzano et al. | 364/200 |
| 4,320,454 | 3/1982 | Suzuki et al. | 364/200 |
| 4,398,245 | 8/1983 | Fujita | 364/200 |
| 4,449,184 | 5/1984 | Pohlman et al. | 364/200 |

FOREIGN PATENT DOCUMENTS 5756747 7/1979 Japan .

Primary Examiner—David Y. Eng
Attorney, Agent, or Firm—Cushman, Darby & Cushman

[57] ABSTRACT

A high speed address calculation circuit for a pipeline-control-system data-processing apparatus includes an instruction register, a register file, an address register, a first data selector, an increment register, a second data selector, a decoder, an adder and a third data selector. The instruction register stores instructions from a memory, and the register file is addressed by the register designation data of the instructions stored in the instruction register. The address register stores an operand address, and the increment register stores increment data calculated in an arithmetic unit. The first data selector selects either the address from the address register or the data from the register file, and the second data selector selects either the data from the increment register or the destination field data included in each instruction. The decoder generates a signal to specify the data to be selected by the first and second data selectors. The adder receives data from the first and second selectors and provides an operand address. The third data selector receives the operand address from the adder and the address generated by the arithmetic unit, selects one of these addresses, and transfers the selected address to the address register.

6 Claims, 3 Drawing Figures

HIGH SPEED ADDRESS CALCULATION CIRCUIT FOR A PIPELINE-CONTROL-SYSTEM DATA-PROCESSOR

BACKGROUND OF THE INVENTION

The present invention relates to a pipeline-control-system data-processing apparatus and, more particularly, to a data processing apparatus for calculating addresses for a move instruction and a vector calculation instruction at high speed by using an operand address-calculating circuit in a pipeline-control-system instruction-processing unit.

A conventional pipeline-control-system data-processing apparatus has a first stage for reading out an instruction, a second stage for decoding the instruction, a third stage for calculating addresses, a fourth stage for reading out an operand, and a fifth stage for executing the instruction. These stages are performed in accordance with parallel processing. This pipeline-control-system data-processing apparatus comprises a main memory 1, an instruction processing unit 3, an arithmetic unit 5, a firmware (F/W) control section 7 for storing a microprogram, and an operand address calculating circuit 9, as shown in FIG. 1. The instruction processing unit 3 reads out an instruction from the main memory 1 and then supplies to the arithmetic unit 5 data and control information, which are required for execution of the readout instruction. When the readout instruction represents that the necessary operand for execution of the arithmetic operation is a storage operand (stored in the main memory 1), the address calculating circuit 9 performs a predetermined address calculation to issue a request to the main memory 1. In addition, the instruction processing unit 3 supplies the necessary data to the arithmetic unit 5. When the arithmetic unit 5 receives the necessary control information and data (for execution of the instruction) from the main memory 1 or the instruction processing unit 3, the arithmetic unit 5 performs the arithmetic operation in accordance with the instruction under the control of the microprogram stored in the F/W control section 7. The calculated result is stored in a predetermined register or memory, thus completing the execution of the instruction.

When a move instruction or a vector calculation instruction is processed by the data processing apparatus shown in FIG. 1, the operand address-calculating circuit 9 is interrupted during the execution of the above-mentioned instruction, since the processing contents of such instructions are complicated. As a result, the microprogram stored in the F/W control section 7 is substantially used to process the instructions in the arithmetic unit 5. It should be noted that a move instruction is performed such that a large amount of data, stored in a memory area A of the main memory 1 and located at consecutive addresses, is moved to a memory area B thereof and is located at other consecutive addresses. It should also be noted that a vector calculation instruction is performed such that a large amount of data, stored in the main memory 1 and located at equidistant address locations, is subjected to the read or the write access.

The arithmetic unit 5 must, therefore, calculate the consecutive operand addresses or the equidistant locations of operand addresses, in addition to its initial function of arithmetic calculation. As a result, the processing capacity of the arithmetic unit 5 is decreased.

In another conventional instruction processing system, the move instruction or the vector calculation instruction is performed by using an operand address-calculating circuit 9 in the instruction processing unit 3. This system is described in Japanese Patent Publication No. 57-56747. The operand address-calculating circuit 9 of this system is shown in FIG. 2. Referring to FIG. 2, an instruction read out from the main memory 1 is set in an instruction register 11. The move instruction, shown in FIG. 2, comprises an operation code OP, a general register number R, an index register number X, a base register number B and data D. An index register file (XR) 15 is addressed by the index register number X and generates readout data to a gate 23. A base register file (BR) 17 is addressed by the base register number B and generates readout data to a gate 25. A decoder 13 decodes the operation code OP and activates one of the gates 23 and 25 in accordance with its output signal. An adder (ADD) 27 adds the data D to the data gated through one of the gates 23 and 25. The operand address from an address register 29 is transferred to the main memory 1, so that the operand is read out from the main memory 1. According to this operand address-calculating circuit 9, the content specified by the operation code OP of the instruction register 11 is decoded by the decoder 13, and the output signal from the decoder 13 is used to control either the gate 23 coupled to the index register 15 or the gate 25 coupled to the base register 17, so that the data to be added by the adder 27 to the data D is controlled. Therefore, the result of the operand address calculation is produced by the address register 29 at high speed. Furthermore, the move instruction or the vector calculation instruction is decoded by the decoder to sequentially calculate the consecutive operand addresses or the equidistant locations of operand addresses under the control of the output generated from the decoder 13. According to this conventional technique, instruction decoding is repeatedly performed, thus prolonging the total processing time. The formats of the move instruction and the vector calculation instruction are extremely complex, so that hardware for decoding and controlling these instructions in the instruction processing unit increases in scale, resulting in inconvenience.

SUMMARY OF THE INVENTION

It is an object of the present invention to provide a pipeline-control-system data-processing apparatus, wherein consecutive operand addresses or equidistant locations of operand addresses can be subjected to high-speed read/write access by using an operand address-calculating circuit in an instruction processing unit.

In order to achieve the above object of the present invention, there is provided in a pipeline-control-system data-processing apparatus having a main memory for storing an instruction and an operand; an instruction processing unit for decoding the instruction, calculating an operand address, and reading out the operand; and an arithmetic unit for processing the instruction under the control of a microprogram, said instruction processing unit comprising:

an instruction register for storing the instruction read out from said main memory;

a register file addressed in accordance with register designation data of the instruction;

an address register for storing the operand address;

a first data selector for receiving the address generated from said address register and the data read out from said register file, and for selecting one of the addresses generated from said address register and the data read out from said register file;

an increment register for storing increment data calculated by said arithmetic unit;

a second data selector for receiving data read out from said increment register and destination field data included in the instruction and for selecting one of the data read out from said increment register and the destination field data;

decoding means for generating a signal for specifying data to be selected by said first and second data selectors;

an adder for receiving the data selected from said first and second data selectors and for calculating an operand address; and a third data selector for receiving the operand address generated from said adder and the address generated from said arithmetic unit and for selecting one of the operand address and the generated address such that selected data is supplied to said address register.

DETAILED DESCRIPTION OF THE PREFERRED EMBODIMENT

Figure 1:
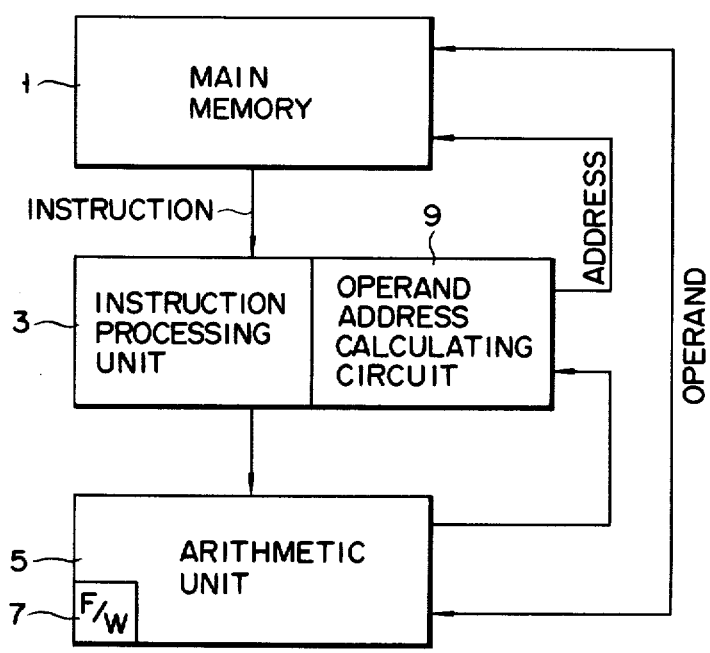
FIG. 1 is a schematic block diagram of a conventional pipeline-control-system data-processing apparatus.
Figure 3:
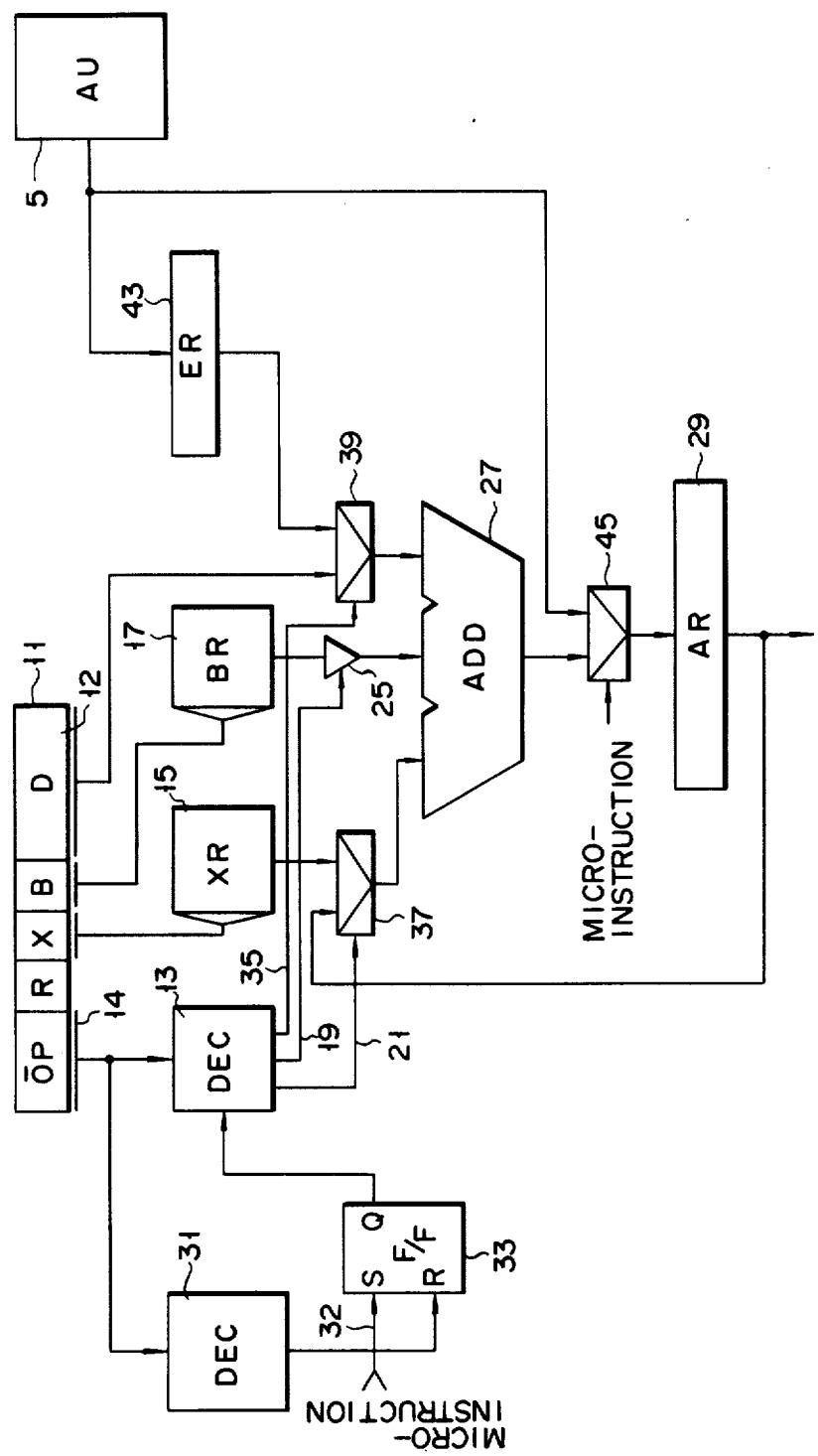
FIG. 3 is a block diagram showing an operand address-calculating circuit applied to a pipeline-control-system data-processing apparatus according to an embodiment of the present invention.

FIG. 3 shows the configuration of an operand address-calculating circuit 9 of an instruction processing unit 1, which is the main feature of the present invention. The overall configuration of the apparatus shown in FIG. 3 is substantially the same as that of the apparatus shown in FIG. 1. The apparatus shown in FIG. 1 is referred to for illustrative convenience.

A decoder 13 decodes an operation code (to be referred to as an OP code hereinafter) of a microinstruction stored in an instruction register 11. Decoded output signals 21, 19, and 35 are supplied to a first data selector 37, an output gate 25 of a base register 17, and a second data selector 39, respectively. An index register file 15 comprises a memory for storing a plurality of index modification data. The index register file 15 is addressed by an index register number X of the macroinstruction. A base register file 17 stores a plurality of base register-modification data and is accessed by a base register number B of the macroinstruction. The first data selector 37 selects one of the outputs read out from the operand address register 29 and the index register 15. The selected data is supplied to one input terminal of an adder 27. The second data selector 39 selects one address accessed by a displacement field (D) 12 of the instruction register 11, or an address increment value set by an increment register (ER) 43. The data selected by the second data selector 39 is supplied to the other input terminal of the adder 27. The output gate 25 controls the output read out from the base register file 17 in response to a signal 19, generated from the decoder 13 and representing the presence/absence of the base address modification data. A third data selector 45 selects one of the outputs from the adder 27 and the arithmetic unit 5. The data selected by the third data selector 45 is supplied to the operand address register 29.

A second decoder 31 decodes the microinstruction read out from the instruction register 11. The second decoder 31 resets a flip-flop 33 when an instruction (e.g., move instruction or vector calculation instruction), which interrupts the pipeline mode, is present. However, when a normal microinstruction is executed, a command signal 32 of the microinstruction is supplied to the set terminal of the flip-flop 33. An output from the flip-flop 33 is supplied to the first decoder 13 and indicates that the pipeline mode is set.

In execution of a move instruction and a vector calculation instruction, a large amount of data stored in the main memory 1 is subjected to repeated read/write access in accordance with a given rule. Therefore, the addresses of the main memory 1 subjected to the read/write access must be sequentially calculated.

The read operation of operand data strings in accordance with the vector calculation instruction will be described hereafter. In this case, the vector calculation instruction is decoded by the decoder 31 to reset the flip-flop 33, thereby interrupting the pipeline mode.

A specified field of the instruction corresponds to an address interval (to be referred to as an element interval hereafter) of a memory area (of the main memory 1) in which the operand data strings, as the object to be calculated in accordance with the vector calculation instruction, are stored. In order to sequentially read out these operand data strings from the main memory 1, the values must be obtained wherein the operand start address is incremented in units of element intervals.

Figure 2:
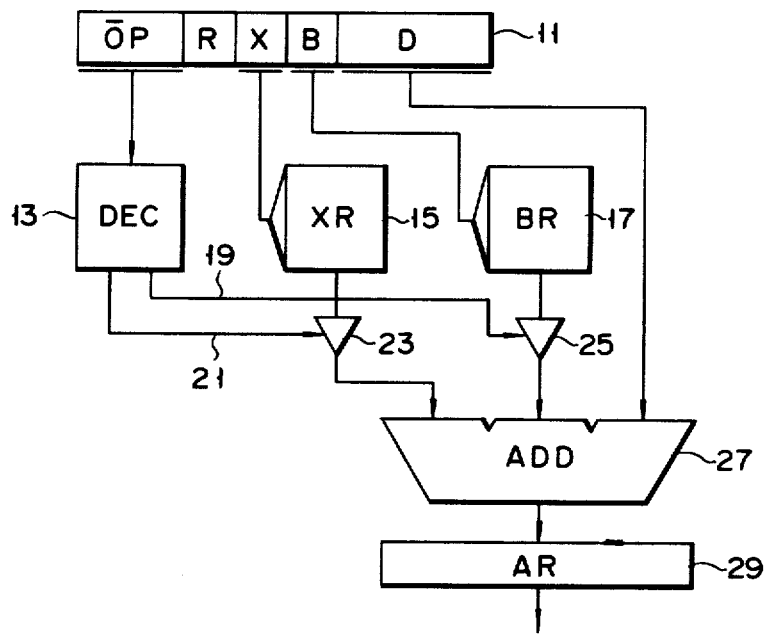
FIG. 2 is a block diagram of an operand address-calculating circuit in an instruction processing unit of the data processing apparatus shown in FIG. 1.

The operand start address is normally calculated by the adder 27 (FIG. 3) under the pipeline control. The start address signal is loaded in the operand address register 29 through the third data selector 45. The start address calculation can be performed in the same manner as in FIG. 2. Alternatively, according to the present invention, the operand address calculation may be performed by the arithmetic unit 5 to calculate the start address under the control of the microprogram stored in the F/W control section 7, and the start address may be loaded in the operand address register 29 through the selector 45. When the start address is calculated by the adder 27, the third data selector 45 is controlled to select the output generated from the adder 27. However, when the start address is calculated by the arithmetic unit 5, the third data selector 45 is controlled to select the output generated from the arithmetic unit 5. The third data selector 45 is controlled in accordance with the microinstruction stored in the F/W control section 7. The element interval values of the vectors, which are calculated by the arithmetic unit 5 in accordance with the microinstruction, are stored in the increment register 43. In addition, the decoder 13 decodes the OP code 14 of the macroinstruction, stored in the macroinstruction register 11, in response to the reset signal from the flip-flop 33, so as to supply the decoded output signal 21 from the first decoder 13 to the first data selector 37. The first data selector 37 supplies to the one input terminal of the adder 27 the output read out from the operand address register 29. Furthermore, the decoder 13 supplies the decoded output signal 35 to the second data selector 39. The second data selector 39 selects the element interval data, stored in the increment register 43, and supplies it to the other input terminal of the adder 27. In addition, the decoder 13 supplies the decoded output signal 19 to the output gate 25. The output gate 25 is disabled so as not to supply the content of the base register 17 to the adder 27. The element interval data is added by the adder 27 to the operand address, so that the resultant operand address is supplied to the third data selector 45. The third data selector 45 is operated to load the output generated from the adder 27 in the operand address register 29 under the control of the microinstruction. The address is supplied from the operand address register 29 to the main memory 1, so that the operand data is read out from the main memory 1. Every time the fetching block of the operand address register 29 occurs, the operand address in the operand address register 29 is added by the adder 27 to the element interval data in the increment register 43.

The control of the fetching block of the operand address register 29, the read/write access control of the operand, and the control of the arithmetic unit can be simultaneously performed by one microinstruction. By repeatedly performing this microinstruction, the vector data can be processed at high speed. According to the present invention, when the move instruction or the vector calculation instruction is decoded, the data to be supplied to the adder 27 can be specified in accordance with the output signal generated from the decoder 13. Without repeatedly performing instruction decoding, the operand address calculation can be performed at high speed.

When the move instruction is performed, the data width to be moved is given as element interval data, which is stored in the increment register 43. The move instruction can be performed in the same manner as in the vector calculation instruction.

What is claimed is:

1. In a pipeline-control-system data-processing apparatus having a main memory for storing an instruction and an operand, an instruction processing unit for decoding the instruction, calculating an operand address and reading out the operand, and an arithmetic unit for processing the instruction under the control of a microprogram and for generating an initial address of the operand, said instruction processing unit comprising:
   an instruction register for storing the instruction read out from said main memory;
   a register file, addressed in accordance with register designation data of the instruction, for storing at least one of index address data and base address data;
   an address register for storing the operand address;
   a first data selector for receiving the address generated from said address register and data read out from said register file and for selecting one of the address generated from said address register and the data read out from said register file;
   an increment register for storing increment data calculated by said arithmetic unit;
   a second data selector for receiving data read out from said increment register and destination field data read out from said instruction register and for selecting one of the data read out from said increment register and the destination field data;
   decoding means for generating a signal for specifying data to be selected by said first and second data selectors;
   an adder for receiving the data selected from said first and second data selectors and for calculating an operand address; and
   a third data selector for receiving the operand address generated from said adder and the initial address generated from said arithmetic unit and for selecting one of the operand addresses and the generated address such that selected data is supplied to said address register.

2. An instruction processing unit, according to claim 1, wherein said decoding means decodes an operation code of the instruction stored in said instruction register, and is operated to generate both a signal specifying selection of the address read out from said address register through said first data selector and a signal specifying selection of the data read out from said increment register when the operation code of the instruction is detected to be a special instruction.

3. A unit, according to claim 2, wherein the special instruction comprises a move instruction.

4. A unit, according to claim 2, wherein the special instruction comprises a vector calculation instruction.

5. A unit, according to claim 2, wherein said decoding means comprises first and second decoders for decoding the operation code, a pipeline mode flip-flop, connected between said first and second decoders and which is reset by said first decoder, and means for supplying to said second decoder an output signal generated from said flip-flop, whereby said flip-flop is reset to interrupt a pipeline mode when the special instruction is decoded by said first decoder, thereby generating control signals from said second decoder to control said first and second data selectors.

6. A unit, according to claim 1, wherein said third data selector performs selection control in accordance with the microinstruction of the microprogram.

* * * * *